US012174714B2

(12) United States Patent
Polasa et al.

(10) Patent No.: US 12,174,714 B2
(45) Date of Patent: Dec. 24, 2024

(54) SYSTEM AND METHOD FOR PROCESSOR DEBUG USING LOW-BANDWIDTH INTERFACE WITH CONFIGURABLE LIST OF SKIP AND LOOP INSTRUCTIONS

(71) Applicant: SILICONCH SYSTEMS PVT LTD, Karnataka (IN)

(72) Inventors: Rakesh Kumar Polasa, Karnataka (IN); Vinay Sadrhalli Nagendra Patel, Karnataka (IN); Shubham Paliwal, Uttar Pradesh (IN); Alagesan Mani, Tamil Nadu (IN)

(73) Assignee: SILICONCH SYSTEMS PVT LTD, Karnataka (IN)

( * ) Notice: Subject to any disclaimer, the term of this patent is extended or adjusted under 35 U.S.C. 154(b) by 81 days.

(21) Appl. No.: 18/110,281

(22) Filed: Feb. 15, 2023

(65) Prior Publication Data

US 2024/0126666 A1 Apr. 18, 2024

(30) Foreign Application Priority Data

Oct. 12, 2022 (IN) ............................ 202241058134

(51) Int. Cl.
*G06F 11/22* (2006.01)
*G06F 11/273* (2006.01)

(52) U.S. Cl.
CPC ........ *G06F 11/2236* (2013.01); *G06F 11/273* (2013.01)

(58) Field of Classification Search
CPC ........................... G06F 11/2236; G06F 11/273
See application file for complete search history.

(56) References Cited

U.S. PATENT DOCUMENTS 7,043,668 B1 * 5/2006 Treue .................. G06F 11/3636 717/124
7,827,539 B1 * 11/2010 Wygodny ........... G06F 11/3409 717/130

(Continued)

OTHER PUBLICATIONS

"DiffTrace: Efficient Whole-Program Trace Analysis and Diffing for Debugging" by Saeed Taheri published by IEEEE 2019 https://ieeexplore.ieee.org/stamp/stamp.jsp?tp=&arnumber=8891027 (Year: 2019).*

(Continued)

*Primary Examiner* — Joseph O Schell
(74) *Attorney, Agent, or Firm* — Procopio, Cory, Hargreaves & Savitch LLP

(57) ABSTRACT

The present disclosure provides a system (100) and a method (200) for real-time debugging of a processor (102). The system includes a debugging unit (104) configured to receive a first set of instructions from the processor. The first set of instructions includes a set of function calls and/or a set of jump instructions. The debugging unit further includes a skip list unit (106) including a skip set of instructions. The skip list unit is configured to remove, from the first set of instructions, the skip set of instructions to generate a second set of instructions. The debugging unit includes a loop exclusion unit (108) configured to determine loops of instructions based on loop unrolling of the second set of instructions to generate a third set of instructions by removing loops of instructions from the second set of instructions. The debugging unit is configured to store the third set of instructions.

10 Claims, 2 Drawing Sheets

(56) References Cited

U.S. PATENT DOCUMENTS

| | | | | |
|---|---|---|---|---|
| 8,407,675 | B1 * | 3/2013 | Clark | G06F 8/52 717/137 |
| 2005/0183072 | A1 * | 8/2005 | Horning | G06F 21/10 717/140 |
| 2013/0091387 | A1 * | 4/2013 | Bohnet | G06F 11/3612 714/45 |
| 2015/0006869 | A1 * | 1/2015 | Ehrlich | G06F 9/30061 712/244 |
| 2015/0186250 | A1 * | 7/2015 | Friedler | G06F 11/261 717/124 |

OTHER PUBLICATIONS

Universal Serial Bus Type-C Cable and Connector Specification Release 2.0, USB 3.0 Promoter Group, Aug. 2019 (373 pages).

Universal Serial Bus Power Delivery Specification, Revision 3.0, Version 2.0, Aug. 29, 2019 (657 pages).

* cited by examiner

SYSTEM AND METHOD FOR PROCESSOR DEBUG USING LOW-BANDWIDTH INTERFACE WITH CONFIGURABLE LIST OF SKIP AND LOOP INSTRUCTIONS

CROSS REFERENCE TO RELATED APPLICATIONS

The present application is based on and claims priority from Indian Patent Application No. 202241058134, filed on Oct. 12, 2022, the entire content of which is incorporated herein by reference.

TECHNICAL FIELD

The present disclosure relates, in general, to a means to debug a processor. In particular, the present disclosure relates to a means to debug a processor efficiently and quickly in real-time through a low bandwidth interface by removing configurable skip list functions and loops.

BACKGROUND

Embedded system may include an electrical system controlled by processors, as well as memory and input/output (I/O) units. The firmware for these embedded systems can be quite tedious. As multiple modules and their communications occur internally to the chip, access to this information is generally difficult when problems occur in software or hardware. Real-time debugging is crucial for the application as firmware flow is essential.

Few exemplary existing technologies in the field of real-time debugging includes light-emitting diode (LED)\pin toggling-based debug, real-time tracing systems and printf process, wherein all of these technologies suffer from the limitations of the requirement of dedicated pins, need for faster equipment to perform faster debugging to get the pin toggling, high-frequency systems (high bandwidth) needed for the on-chip debugging and the external debugging unit, high internal buffer for storing the entire firmware flow, and occupies more firmware size, as debug related codes are added, which might be costly for one time programmable memories.

Therefore, there is a need in the art to provide a means that can exhibit real-time debugging by using low-frequency components, low bandwidth interface, and thereby can be designed in a simple, low-cost fashion.

OBJECTS OF INVENTION

An object of the present invention is to provide a system that may eliminate memory and high-speed requirement by storing the minimal information.

Another object of the present invention is to provide a system that can send minimal information such as entry data, exit data in the on-chip debugging and code addition in firmware is avoided.

Another object of the present invention is to provide a system that can be operated at lower frequency and lower bandwidth, since minimal information is stored in the on-chip debugging. The parts of transmitted information can be lost/corrupted as a part of communication from on-chip debugging (OCD) to external debugging unit (EDU), EDU is equipped with a feature to correct these errors based on the firmware flow/context.

Another object of the present invention is to provide a system than can have a configurable skip list of functions that are not required for real time debugging, thereby further reducing memory and bandwidth requirement.

Another object of the present invention is to provide a system which can detect software loops in a loop detect block through loop unrolling detection in second iteration of the program counter for function call/return or jump instructions and skip this additionally to reduce the memory and bandwidth requirement on the skip adjusted function calls to debug a microcontroller unit on a real time basis.

Another object of the present invention is to provide a system in which the internal FIFO/buffer size is smaller leading to silicon area savings.

Another object of the present invention is to provide a system that can transmit only a part of program counter for entry and exit of the function in an encoded manner, thus utilizing lower bandwidth interface, and the decoding of the encoded PC may be performed at the external debugging unit.

Another object of the present invention is to provide a system to reduce the cost of real-time debugging by using low frequency components in the external debugging unit.

Another object of the present invention is to provide a system that can dynamically correct any error in the communication at the external debugging side, as the trace information is known.

Yet another object of the present invention is to provide a system that can reduce information bandwidth by splitting and taking complementary program counter bits for entry/exit calls respectively, and information may be re-constructed at the external debugging side effectively.

SUMMARY

The present disclosure relates, in general, to a means to debug a processor. In particular, the present disclosure relates to a means to debug a processor efficiently and quickly in real-time through a low bandwidth interface by removing configurable skip list functions and loops.

In a first aspect, the present disclosure provides a system for real-time debugging of a processor. The system includes a processor configured in a hardware system and configured to execute one or more sets of instructions. The processor includes a program counter. The program counter is configured to generate a set of values corresponding to each set of instruction executed by the processor. The system further includes a debugging unit configured in the hardware system, and communicably coupled to the processor. The debugging unit is configured to receive a first set of instructions from the processor. The first set of instructions includes any one or a combination of a set of function calls and a set of jump instructions. The debugging unit includes a skip list unit including a first data set storing a skip set of instructions. The skip list unit is configured to remove from the received first set of instructions, the skip set of instructions to generate a second set of instructions. The debugging unit further includes a loop exclusion unit configured to receive the second set of instructions and determine loops of instructions while the second set of instructions are being executed by the processor, based on loop unrolling of the second set of instructions to generate a third set of instructions by removing loops of instructions from the second set of instructions. The debugging unit is configured to store the third set of instructions.

In some embodiments, the debugging unit further includes an encoder configured to receive the third set of instructions from the loop exclusion unit and encode the third set of instructions. The encoder further compresses the third set of instructions such that an encoded third set of instructions has a minimal information size. The debugging unit further includes a storage unit configured to receive, from the encoder, the encoded third set of instructions, and store the encoded third set of instructions therein. The debugging unit further includes a transmitter communicably coupled to the storage unit and configured to transmit the encoded third set of instructions.

In some embodiments, the storage unit is a first in first out buffer.

In some embodiment, the system further includes an external debugging unit communicably coupled to the debugging unit via an interface, the external debugging unit configured to receive, at a receiver, the encoded third set of instructions from the transmitter of the debugging unit. The external debugging unit is configured to identify the encoded third set of instructions based on a matching of the encoded third set of instructions with a corresponding reference set of instructions. The external debugging unit decodes the encoded third set of instructions to retrieve the third set of instructions. The external debugging unit is configured to rectify any one or a combinations of physical communication interface errors and decoding errors in the retrieved third set of instructions.

In some embodiments, the interface is any or a combination of 1-wire, 2-wire, 4-wire, and joint test action group (JTAG). In some embodiments, the transmitter and the receiver are correspondingly any or a combination of 1-wire, 2-wire, 4-wire, and joint test action group (JTAG).

In some embodiments, the external debugging unit further includes a receiver configured to receive the encoded third set of instructions.

In some embodiments, the external debugging unit includes a decoder configured to decode the encoded third set of instructions.

In a second aspect, the present disclosure provides a method for real-time debugging of a processor. The method includes receiving, by a processor, from a debugging unit, a first set of instructions. The processor is configured in a hardware system, and configured to execute one or more sets of instructions, the processor including a program counter configured to generate a set of values corresponding to each set of instruction executed by the processor. The first set of instructions includes any one or a combination of a set of function calls and a set of jump instructions. The method further includes removing, by the debugging unit, from the first set of instructions, a skip set of instructions to generate a second set of instructions, wherein the skip set of instructions is stored in a first data set. The method further includes determining, by the debugging unit, from the second set of instructions, loops of instructions while the second set of instructions are being executed by the processor, based on loop unrolling of the second set of instructions to generate a third set of instructions by removing loops of instructions from the second set of instructions. The method further includes storing, by the debugging unit, the third set of instructions.

In some embodiments, the method further includes receiving, by the debugging unit, the third set of instructions. The method further includes encoding, by the debugging unit, the third set of instructions. The debugging unit further compresses the third set of instructions such that an encoded third set of instructions has a minimal information size. The method further includes storing, by the debugging unit, the encoded third set of instructions. The method further includes transmitting, by the debugging unit, the encoded third set of instructions.

In some embodiments, the method further includes receiving, by an external debugging unit, the encoded third set of instructions. The method further includes identifying, by the external debugging unit, the encoded third set of instructions based on a matching of the encoded third set of instructions with a corresponding reference set of instructions. The method further includes decoding, by the external debugging unit, the encoded third set of instructions to retrieve the third set of instructions. The method further includes rectifying, by the external debugging unit, any one or a combinations of physical communication interface errors and decoding errors in the retrieved third set of instructions.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The following drawings form part of the present specification and are included to further illustrate aspects of the present disclosure. The disclosure may be better understood by reference to the drawings in combination with the detailed description of the specific embodiments presented herein.

DETAILED DESCRIPTION

Figure 1:
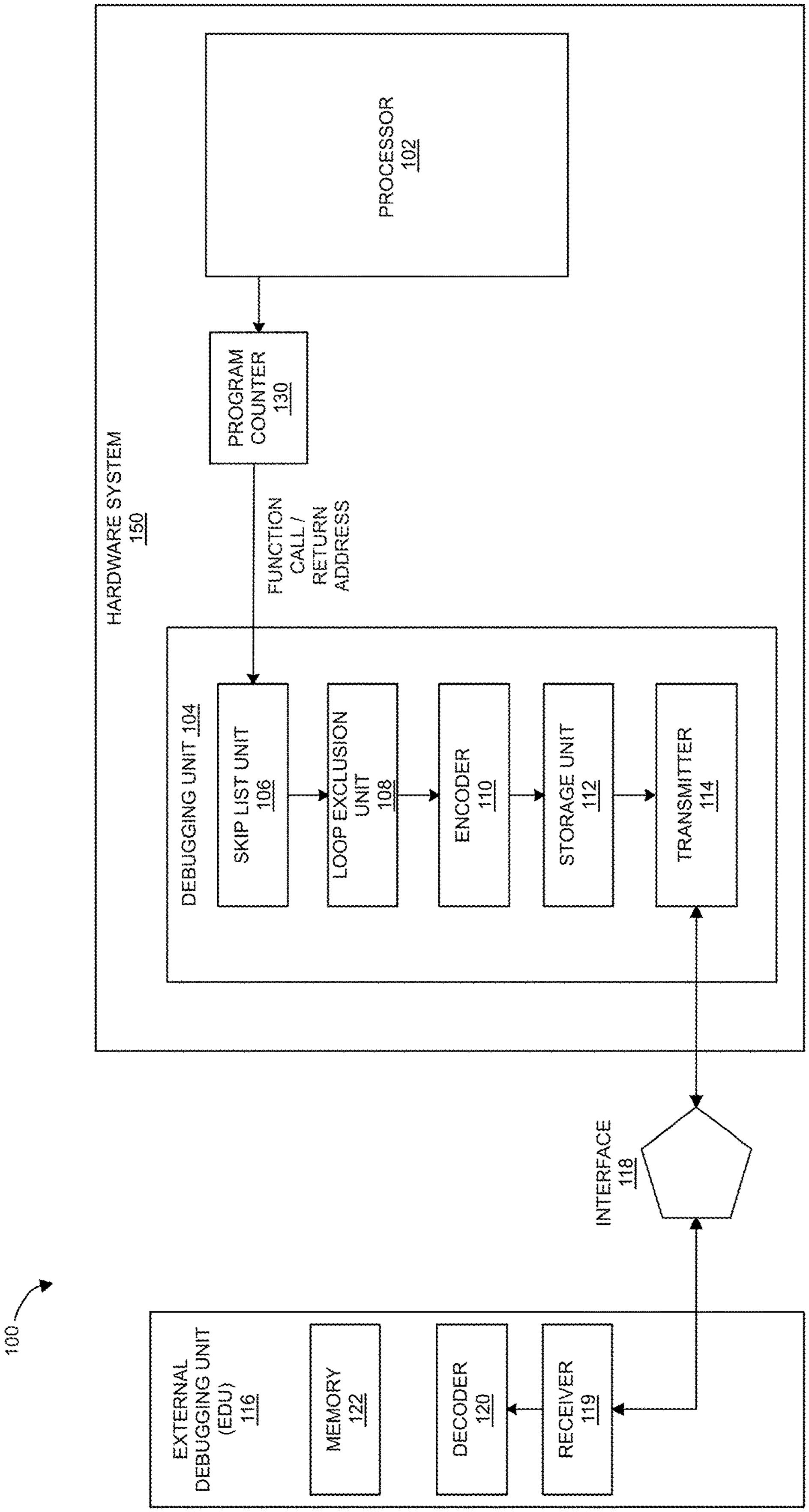
FIG. 1 illustrates a schematic block diagram of a system for real-time debugging of a processor, in accordance with an embodiment of the present disclosure.

The following is a detailed description of embodiments of the disclosure depicted in the accompanying drawings. The embodiments are in such detail as to clearly communicate the disclosure. If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The present disclosure relates, in general, to a debugging system, and more specifically, relates to a system and method for debugging a processor. The processor may be a microcontroller unit (MCU), or a microprocessor unit (MPU). The system may include an on-chip debugging unit, which collects function entry/exit and jump to/from interrupt service routines and fills the storage unit, for example, a FIFO/buffer, based on the configuration. The present disclosure discloses an efficient method, which can be used for real-time debugging of a set of instructions with minimal storage unit and frequency requirements. An external debugging unit (EDU) helps to recognize the received serial data and translates the received serial data into meaningful firmware flow information in real-time. The system can reduce the amount of space required to store trace data on-chip as well as reduce the amount of off-chip data transfer.

The present disclosure debugs a live processor running in any hardware system. Some examples of hardware systems include, without limitations, embedded systems, systems on chip (SoC), application specific integrated circuit (ASIC), field programmable gate array (FPGA), etc. The debugging happens through storing the minimal information of calls to the different functions, exits from those function, jump to/from interrupt service routines and the like, instead of tracing the entire program counter flow. The minimal information is stored into a storage unit, which is present in the system and constitutes part of the on-chip debugging unit. The recursive calls to a function are understood by the on-chip debugging unit and masked by it. The external debugging unit interacts with the on-chip debugging unit through either 1/2/4—wire and JTAG debugging interfaces. The on-chip debugging unit also has a facility to track only a portion of the code, if required, based on the configuration from the external debugging unit.

In a first aspect, the present disclosure provides a system for real-time debugging of a processor. The system includes a processor configured in a hardware system and configured to execute one or more sets of instructions. The processor includes a program counter. The program counter is configured to generate a set of values corresponding to each set of instruction executed by the processor. The system further includes a debugging unit configured in the hardware system, and communicably coupled to the processor. The debugging unit is configured to receive a first set of instructions from the processor. The first set of instructions includes any one or a combination of a set of function calls and a set of jump instructions. The debugging unit includes a skip list unit including a first data set storing a skip set of instructions. The skip list unit is configured to remove from the received first set of instructions, the skip set of instructions to generate a second set of instructions. The debugging unit further includes a loop exclusion unit configured to receive the second set of instructions and determine loops of instructions while the second set of instructions are being executed by the processor, based on loop unrolling of the second set of instructions to generate a third set of instructions by removing loops of instructions from the second set of instructions. The debugging unit is configured to store the third set of instructions.

In some embodiments, the debugging unit further includes an encoder configured to receive the third set of instructions from the loop exclusion unit and encode the third set of instructions. The encoder further compresses the third set of instructions such that an encoded third set of instructions has a minimal information size. The debugging unit further includes a storage unit configured to receive, from the encoder, the encoded third set of instructions, and store the encoded third set of instructions therein. The debugging unit further includes a transmitter communicably coupled to the storage unit and configured to transmit the encoded third set of instructions.

In some embodiments, the storage unit is a first in first out buffer.

In some embodiment, the system further includes an external debugging unit communicably coupled to the debugging unit via an interface, the external debugging unit configured to receive, at a receiver, the encoded third set of instructions from the transmitter of the debugging unit. The external debugging unit is configured to identify the encoded third set of instructions based on a matching of the encoded third set of instructions with a corresponding reference set of instructions. The external debugging unit decodes the encoded third set of instructions to retrieve the third set of instructions. The external debugging unit is configured to rectify any one or a combinations of physical communication interface errors and decoding errors in the retrieved third set of instructions.

In some embodiments, the interface is any or a combination of 1-wire, 2-wire, 4-wire, and joint test action group (JTAG). In some embodiments, the transmitter and the receiver are correspondingly any or a combination of 1-wire, 2-wire, 4-wire, and joint test action group (JTAG).

In some embodiments, the external debugging unit further includes a receiver configured to receive the encoded third set of instructions.

In some embodiments, the external debugging unit includes a decoder configured to decode the encoded third set of instructions.

In a second aspect, the present disclosure provides a method for real-time debugging of a processor. The method includes receiving, by a processor, from a debugging unit, a first set of instructions. The processor is configured in a hardware system, and configured to execute one or more sets of instructions, the processor including a program counter configured to generate a set of values corresponding to each set of instruction executed by the processor. The first set of instructions includes any one or a combination of a set of function calls and a set of jump instructions. The method further includes removing, by the debugging unit, from the first set of instructions, a skip set of instructions to generate a second set of instructions, wherein the skip set of instructions is stored in a first data set. The method further includes determining, by the debugging unit, from the second set of instructions, loops of instructions while the second set of instructions are being executed by the processor, based on loop unrolling of the second set of instructions to generate a third set of instructions by removing loops of instructions from the second set of instructions. The method further includes storing, by the debugging unit, the third set of instructions.

In some embodiments, the method further includes receiving, by the debugging unit, the third set of instructions. The method further includes encoding, by the debugging unit, the third set of instructions. The debugging unit further compresses the third set of instructions such that an encoded third set of instructions has a minimal information size. The method further includes storing, by the debugging unit, the encoded third set of instructions. The method further includes transmitting, by the debugging unit, the encoded third set of instructions.

In some embodiments, the method further includes receiving, by an external debugging unit, the encoded third set of instructions. The method further includes identifying, by the external debugging unit, the encoded third set of instructions based on a matching of the encoded third set of instructions with a corresponding reference set of instructions. The method further includes decoding, by the external debugging unit, the encoded third set of instructions to retrieve the third set of instructions. The method further includes rectifying, by the external debugging unit, any one or a combinations of physical communication interface errors and decoding errors in the retrieved third set of instructions.

FIG. 1 illustrates a schematic block diagram of a system 100 for real-time debugging of a processor 102, in accordance with an embodiment of the present disclosure. The system 100 is configured to debug a processor 102 running in a hardware system 150 to analyse an operation of the processor 102. The processor 102 may be a microcontroller unit (MCU), or a microprocessor unit (MPU). The hardware system 150 can be any or a combination of embedded system, application-specific integrated circuit (ASIC), system on a chip (SoC), and field-programmable gate arrays (FPGA). The system 100 can reduce the amount of space required to store trace data on-chip as well as reduce the amount of off-chip data transfer. The system 100 may include the hardware system 150, an external debugging unit (EDU) 116, and an external interface 118. The hardware system 150 may include the processor 102, and an on-chip debugging unit 104. Further, the debugging unit 104 may be coupled to the external debugging unit 116 through the external interface 118, where the debugging unit 104 may process the received information and may send the processed information to the external debugging unit 116 to perform real-time tracing.

In an exemplary embodiment, the processor 102 as presented in the example may be microcontroller (MCU). As can be appreciated, the present disclosure may not be limited to this configuration but may be extended to other configurations. The processor 102 configured in the hardware system 150 may execute a set of instructions, the processor 102 may include a program counter 130 that generates a set of values corresponding to each set of instruction execute by the processor 102.

The debugging unit 104 is configured in the hardware system 150. The debugging unit 104 is communicably coupled to the processor 102, and the debugging unit 104 is configured to receive a first set of instructions from the processor 102. The first set of instructions includes any or a combination of a set of jump instructions and a set of function calls. In some embodiments, the first set of instructions are received by the debugging unit 104 through the program counter 130. The program counter 130 may be configured to provide the first set of instructions out of an overall set of instructions executed by the processor 102.

In some embodiments, the debugging unit 104 may fetch a selective set of data packets of the set of instructions from the processor 102, the selective set of data packets pertaining to trace data that may include the set of values of any or a combination of entry data, exit data, and goto/jump data. The entry data and exit data pertaining to functions which includes interrupt service routines, bootloader and compiler introduced function because of optimizations. The set of values may include the address of the entry data, exit data, and goto/jump data.

The debugging unit 104 includes a skip list unit 106, and a loop exclusion unit 108. The skip list unit 106 includes a first data set storing a skip set of instructions. The skip set of instructions may be a sub-set of the set of instructions received by the debugging unit 104 from the processor 102 that may be skipped for considerations of real-time debugging. The skip list unit 106 is configured to remove from the received first set of instructions, the skip set of instructions to generate a second set of instructions. In other words, the second set of instructions may include the first set of instructions, except for the skip set of instructions.

The loop exclusion unit 108 is configured to receive the second set of instruction from the skip list unit 106. The loop exclusion unit 108 is further configured to determine loops of instructions while the second set of instructions are being executed by the processor 102. The loops of instructions may be determined based on loop unrolling of the second set of instructions. In some embodiments, the loop unrolling may occur in at most two iterations. The loop exclusion unit 108 is further configured to generate a third set of instructions by removing the loops of instructions from the second set of instructions. The debugging unit 104 is configured to store the generated third set of instructions.

The debugging unit 104 further includes an encoder 110 that is configured to receive the third set of instructions from the loop exclusion unit 108 and encode the third set of instructions. The encoder 110 further compresses the third set of instructions such that an encoded third set of instructions has a minimal information size. The debugging unit 104 further includes a storage unit 112 configured to receive the encoded third set of instructions from the encoder 110 and store the encoded third set of instructions therein. In some embodiments, the storage unit 112 may be a first in first out (FIFO) buffer.

For example, the debugging unit 104 functionality helps in collecting the function entry/exit and jump to/from interrupt service routines and fills the storage unit 112 based on the configuration. The debugging may happen through storing the minimal information of calls to the different functions, exits from those function, jump to/from interrupt service routines instead of tracing the entire program counter flow. The storage unit 112 can be configured to mask recursive function calls. Thus, by using the storage unit 112 for storing the minimal information of data packets e.g., calls, the memory and high-speed requirement may be eliminated, i.e., storage space may be saved, and an amount of bandwidth needed to transfer the trace data/information to the external debugging unit 116 may be reduced.

In another embodiment, data to the storage unit 112 may be pushed whenever there is a function call, a function return and jumps to/from interrupt service routines. On every call, the most significant bit (MSB) in the program counter 130 may be pushed after the completion of the call instruction and on every return, the least significant bit (LSB) of the program counter 130 which also includes the identification bits may be pushed when the instruction exits. The above-mentioned process may provide sufficient information required for knowing the set of instructions flow. Thus, the information bandwidth may be reduced by splitting and taking complementary program counter bits for entry/exit calls respectively, and the information is re-constructed at the external debugging side.

The debugging unit 104 may further include a transmitter 114 communicably coupled to the storage unit 112. The transmitter 116 may access data from the storage unit 112 after the transmission of the previous byte until the storage unit 112 reaches an empty state, where the transmission of data can be achieved by the external interface 118.

In another embodiment, the external debugging unit 116 is operatively coupled to the debugging unit 104 through the external interface 118. In some embodiments, the external interface 118 may be any or a combination of 1-wire, 2-wire, 4-wire debugging interfaces. As can be appreciated, the present disclosure may not be limited to this configuration but may be extended to other configurations such as joint test action group (JTAG) and the like.

The external debugging unit 116 can access the processor 102 through serial communications. The external debugging unit 116 may receive, at a receiver 119, the encoded third set of instructions from the debugging unit 104 via the external interface 118. The external debugging unit 116 is configured to identify the encoded third set of instructions based on a matching of the encoded third set of instructions with a corresponding reference set of instructions. The external debugging unit 116 decodes the encoded third set of instructions to retrieve the third set of instructions. The external debugging unit 116 includes a decoder 120 configured to decode the encoded third set of instructions. The external debugging unit 116 is further configured to rectify any one or a combinations of physical communication interface errors and decoding errors in the retrieved third set of instructions. The physical communication interface errors may be caused due to physical interface. The external debugging unit 116 may store a copy of a firmware of the processor 102, and it may trace the instructions being decoded with the instructions that it has stored as reference. The external debugging unit 116 may rectify the errors in decoding (error due to physical medium and compression losses) depending on the context when comparing with the reference instructions. The parts of transmitted information can be lost/corrupted as a part of communication from the debugging unit 104 to the external debugging unit 116. The external debugging unit 116 is equipped with a feature to correct these errors based on the firmware flow/context. The external debugging unit 116 may include a memory 122 configured to store the reference set of instructions.

The external debugging unit 116 may identify the encoded set of data packets received from the on-chip debugging 108 based on the matching of the encoded set of data packets with a reference set of data packets. The external debugging unit 116 may decode the encoded set of data packets to form the meaningful set of instructions, where the reference set of data packets may include stored entry and exit address of the set of instructions in the external debugging unit 116. The reference set of data packets may contain the copy of the entire firmware and it can trace the firmware with the firmware copy that it contains.

For example, the external debugging unit 116 may be provided with the set of instructions, e.g., firmware with all information such as entry and exit addresses of all functions priorly. On receiving the debug/trace data, the external debugging unit 116 may map these received data packets with the reference set of data packets. Based on the presence of identification bits, the external debugging unit 116 may infer whether the received data is for a function call or function return. It tries to match the last return address with last called address and hence matching the set of instructions, e.g., firmware flow. Thus, the information of processor 102, which is working in very high frequency can be reciprocated to the outer interface with external debugging unit 116, which is working at a lower frequency compared to the processor 102, i.e., low bandwidth interface may be used for the information transmission.

Thus, the system 100 may eliminate memory and high-speed requirement by using the storage unit 112 for storing the minimal information of calls. The debugging unit 104 supports selective tracing when the selected function routines executed. The information bandwidth may be reduced by splitting and taking complementary program counter bits for entry/exit calls respectively, and information may be re-constructed at the external debugging side effectively. The system 100 can dynamically correct any error in the communication at the external debugging unit 116, as the call trace information is known. As the debugging information is reduced attributed to minimal information and to the splitting of the information, the information can be relayed using low bandwidth interface depending on the speed of the processor 102, and any optimizations performed by the compiler/linker are also considered in the trace debugging.

Figure 2:
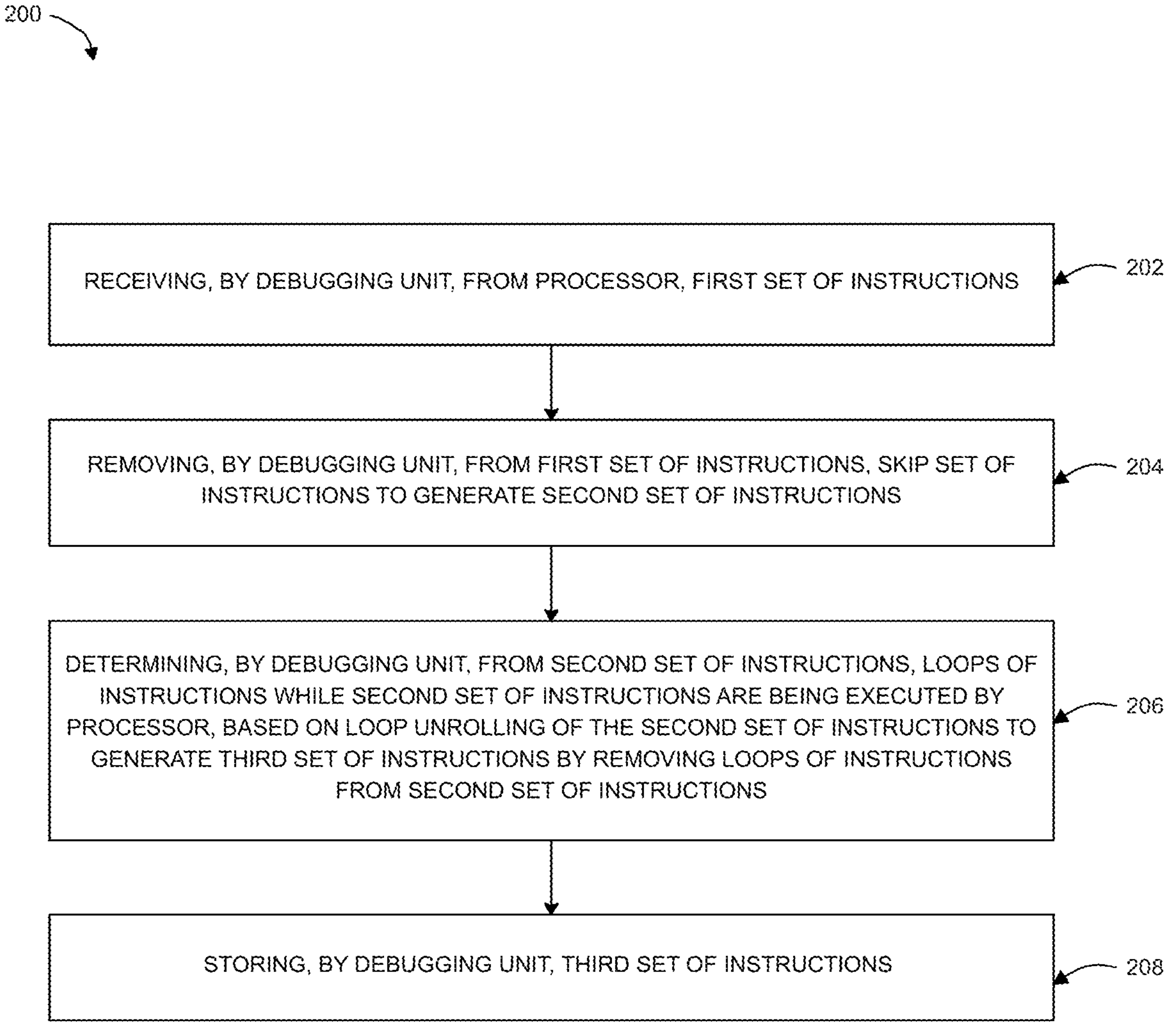
FIG. 2 illustrates a schematic flow diagram of a method for real time debugging of a processor, in accordance with an embodiment of the present disclosure.

FIG. 2 illustrates a schematic flow diagram for a method 200 for real-time debugging of a processor 102, in accordance with an embodiment of the present disclosure. At step 202, the method 200 includes receiving, by the debugging unit 104, from the processor 102, the first set of instructions. At step 204, the method 200 further includes removing, by the debugging unit 104, from the first set of instructions, a skip set of instructions to generate a second set of instructions. At step 206, the method 200 further incudes determining, by the debugging unit 104, from the second set of instructions, loops of instructions while the second set of instructions are being executed by the processor 102, based on loop unrolling of the second set of instructions to generate a third set of instructions by removing loops of instructions from the second set of instructions. At step 208, the method 200 further includes storing, by the debugging unit 104, the third set of instructions.

It will be apparent to those skilled in the art that the system 100 of the disclosure may be provided using some or all of the mentioned features and components without departing from the scope of the present disclosure. While various embodiments of the present disclosure have been illustrated and described herein, it will be clear that the disclosure is not limited to these embodiments only. Numerous modifications, changes, variations, substitutions, and equivalents will be apparent to those skilled in the art, without departing from the spirit and scope of the disclosure, as described in the claims.

Advantages of Invention

The present invention provides a system that may eliminate higher memory and high-speed requirement by storing the minimal information.

The present invention provides a system that can send minimal information such as entry data, exit data in the on-chip debugging and code addition in firmware is avoided.

The present invention provides a system that can be operated at lower frequency and lower bandwidth, since minimal information is stored in the on-chip debugging.

The present invention provides a system in which the internal FIFO/buffer size is smaller leading to silicon area savings.

The present invention provides a system that can transmit only a part of program counter for entry and exit of the function in an encoded manner, thus utilizing lower bandwidth interface, and the decoding of the encoded PC may be performed at the external debugging unit effectively.

The present invention provides a system to reduce the cost of real-time debugging by using low frequency components in the external debugging unit.

The present invention provides a system that can dynamically correct any error in the communication at the external debugging side, as the trace information is known.

The present invention provides a system that can reduce information bandwidth by splitting and taking complementary program counter bits for entry/exit calls respectively, and information may be re-constructed at the external debugging side effectively.

We claim:

1. A system for real-time debugging of a processor, the system comprising:

a processor configured in a hardware system, and configured to execute one or more sets of instructions, the processor comprising a program counter, wherein the program counter is configured to generate a set of values corresponding to each set of instruction executed by the processor; and a debugging unit configured in the hardware system, and communicably coupled to the processor, the debugging unit configured to receive a first set of instructions from the processor, wherein the first set of instructions comprises any one or a combination of a set of function calls and a set of jump instructions, the debugging unit further comprising:

a skip list unit comprising a first data set storing a skip set of instructions, wherein the skip list unit is configured to remove, from the received first set of instructions, the skip set of instructions to generate a second set of instructions; and a loop exclusion unit configured to receive the second set of instructions, and determine loops of instructions while the second set of instructions are being executed by the processor, based on loop unrolling of the second set of instructions to generate a third set of instructions by removing loops of instructions from the second set of instructions, wherein the debugging unit is configured to store the third set of instructions.

2. The system of claim 1, wherein the debugging unit further comprises:

an encoder configured to receive the third set of instructions from the loop exclusion unit (108), and encode the third set of instructions, wherein the encoder further compresses the third set of instructions such that an encoded third set of instructions has a minimal information size;

a storage unit configured to receive, from the encoder, the encoded third set of instructions, and store the encoded third set of instructions therein; and a transmitter communicably coupled to the storage unit and configured to transmit the encoded third set of instructions.

3. The system of claim 2, wherein the storage unit is a first in first out (FIFO) buffer.

4. The system of claim 2, further comprising:

an external debugging unit (EDU) communicably coupled to the debugging unit via an interface, the external debugging unit configured to receive, at a receiver, the encoded third set of instructions from the transmitter of the debugging unit, wherein, the external debugging unit is configured to identify the encoded third set of instructions based on a matching of the encoded third set of instructions with a corresponding reference set of instructions, wherein the external debugging unit decodes the encoded third set of instructions to retrieve the third set of instructions, and wherein the external debugging unit is configured to rectify any one or a combinations of physical communication interface errors and decoding errors in the retrieved third set of instructions.

5. The system of claim 4, wherein the interface is any or a combination of 1-wire, 2-wire, 4-wire, and joint test action group (JTAG), and wherein the transmitter and the receiver are correspondingly any or a combination of 1-wire, 2-wire, 4-wire, and joint test action group (JTAG).

6. The system of claim 1, wherein the external debugging unit comprises a receiver configured to receive the encoded third set of instructions.

7. The system of claim 1, wherein the external debugging unit comprises a decoder configured to decode the encoded third set of instructions.

8. A method for real-time debugging of a processor, the method comprising:

receiving, by a debugging unit, from a processor, a first set of instructions, wherein the processor is configured in a hardware system, and configured to execute one or more sets of instructions, the processor comprising a program counter configured to generate a set of values corresponding to each set of instruction executed by the processor, wherein the first set of instructions comprises any one or a combination of a set of function calls and a set of jump instructions;

removing, at the debugging unit, from the first set of instructions, a skip set of instructions to generate a second set of instructions, wherein the skip set of instructions is stored in a first data set;

determining, at the debugging unit, from the second set of instructions, loops of instructions while the second set of instructions are being executed by the processor, based on loop unrolling of the second set of instructions to generate a third set of instructions by removing loops of instructions from the second set of instructions; and storing, by the debugging unit, the third set of instructions.

9. The method of claim 8, further comprising:

receiving, at the debugging unit, the third set of instructions;

encoding, at the debugging unit, the third set of instructions, wherein the debugging unit further compresses the third set of instructions such that an encoded third set of instructions has a minimal information size;

storing, at the debugging unit, the encoded third set of instructions; and transmitting, by the debugging unit, the encoded third set of instructions.

10. The method of claim 8, further comprising:

receiving, at an external debugging unit, the encoded third set of instructions;

identifying, by the external debugging unit, the encoded third set of instructions based on a matching of the encoded third set of instructions with a corresponding reference set of instructions;

decoding, by the external debugging unit, the encoded third set of instructions to retrieve the third set of instructions; and rectifying, by the external debugging unit, any one or a combinations of physical communication interface errors and decoding errors in the retrieved third set of instructions.

* * * * *